United States Patent Office 3,591,595
Patented July 6, 1971

1

3,591,595
CERTAIN 2 - HYDROXYLOWERALKYL-TETRA-HYDRO-2-H-INDENO[1,2-c]PYRIDINES AND 2-HYDROXY LOWERALKYL-HEXAHYDRO-2-H-INDENO[1,2-c]PYRIDIN 5-OLS
Anton Ebnother, Arlesheim, and Jean-Michel Bastian, Birsfelden, Switzerland, assignors to Sandoz Ltd. (also known as Sandoz AG), Basel, Switzerland
No Drawing. Filed Apr. 1, 1969, Ser. No. 812,306
Claims priority, application Switzerland, Apr. 5, 1968, 5,123/68; Dec. 19, 1968, 18,945/68
Int. Cl. C07d 29/16, 31/28
U.S. Cl. 260—294.7      14 Claims

ABSTRACT OF THE DISCLOSURE

The invention concerns acid addition salts of indenopyridine derivatives of the formula:

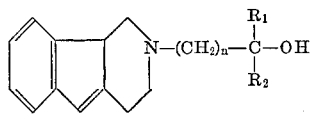

wherein $n$ is an integer of from 1 to 4, and $R_1$ and $R_2$ are hydrogen or lower alkyl of 1 to 4 carbon atoms.

The abovementioned acid addition salts exhibit psychotropic properties and more particularly, the compounds are useful antidepressants.

A process for the production of the compounds is furthermore described.

---

The present invention relates to acid addition salts of new indenopyridine derivatives of Formula I,

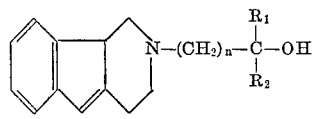

I in which $n$ signifies an integer from 1 to 4, and
$R_1$ and $R_2$ signify hydrogen or lower alkyl of 1 to 4 carbon atoms, as well as processes for their production.

The compounds of general Formula I have one or more asymmetric carbon atoms and therefore exist as racemates or in the form of optical antipodes.

An acid addition salt of the new indenopyridine derivatives of general Formula I may be produced in accordance with the invention by removing water from a hydroxy compound of Formula II,

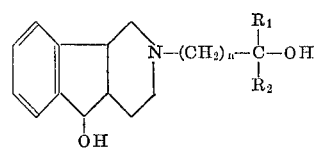

II in which $n$, $R_1$ and $R_2$ have the above significance, by treatment with a strong acid.

The compounds of Formula I are stable in the form of their acid addition salts. In the form of the free bases, however, a rearrangement occurs with a shifting of the double bond in the 4a–5 position. Strong acids which form crystalline salts with the compounds of Formula I are preferably used for the removal of water.

Examples of suitable strong acids for the removal of water are mineral acids (e.g. in aqueous or alcoholic solution), such as hydrochloric, hydrobormic, hydriodic, sulphuric or phosphoric acid, or organic acids, e.g. organic sulphonic acids, such as methane-sulphonic acid, benzene-sulphonic acid or naphthalene-1,5-disulphonic acid.

The hydroxy compounds of general Formula II may be used in the form of the free bases or in the form of an acid addition salt, e.g. the hydrochloride. The process may, for example, be effected at a temperature from room temperature to the boiling temperature of the reaction mixture, preferably at one of the extremes of this range. The reaction time may, for example, range from about ½ to 24 hours. The resulting acid addition salt of general Formula I usually already separates as a crystalline precipitate during heating or upon cooling the reaction mixture. If no precipitate results the reaction solution is evaporated until crystallization commences or to dryness and the resulting acid addition salts of the compounds of general Formula I are optionally purified in manner known per se, e.g. by crystallization from suitable solvents, such as methanol, ethanol, isopropanol, ethanol/ether, water, dilute aqueous hydrochloric acid.

As indicated, the lower alkyl radicals represented by the symbols $R_1$ and $R_2$ may contain from 1 to 4 carbon atoms, but 1 or 2 carbon atoms is preferred.

The pharmaceutically acceptable acid addition salts of the compounds of Formula I are useful because they possess pharmacological properties in animals. The compounds exhibit psychotropic properties, and more particularly the compounds are useful anti-depresssants as indicated by their activity in inhibiting the effects of reserpine in mice and their activity in potentiating excitation conditions caused by DOPA or amphetamine, also in mice. Further illustrative of the psychotropic properties exhibited by the compounds is their activity in producing a taming effect in mice and an anorexigenic effect in rats.

For the above-mentioned use, the dosage administered will, of course, vary depending upon the compound employed, mode of administration and treatment desired. However, in general satisfactory results are obtained when administered at a daily dosage of from about 0.15 milligram to about 1.5 milligrams per kilogram of animal body weight, preferably given in divided doses 2 to 3 times a day or in sustained release form. For the larger mammals, the total daily dosage is in the range of from about 10 milligrams to about 100 milligrams, and dosage forms suitable for oral administration comprise from about 3 milligrams to about 50 milligrams of the compound admixed with a solid or liquid pharmaceutical carrier or diluent.

The physiologically tolerable, water-soluble acid addition salts of the new indenopyridine derivatives may be used as medicaments on their own or in the form of suitable medicinal preparations for enteral or parenteral administration. In order to produce such medicinal preparations the active compounds are worked up with inorganic or organic, pharmacologically inert adjuvants. Examples of such adjuvants are for tablets and dragées: lactose, starch, talc, stearic acid: for injectable solutions: water, alcohols, glycerin, vegetable oils. The preparations may furthermore contain suitable preserving, stabilizing or wetting agents, solubilizers, sweetening and colouring substances, flavourings.

The starting materials of general Formula II are new and may be obtained by (a) condensing 1,3,4,4a,5,9b-hexahydro - 2H - indeno-[1,2-c]pyridin-5-ol of Formula III

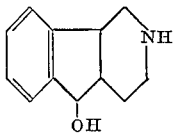

with a compound of Formula IV.

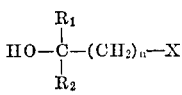

in which $n$ signifies an integer from 1 to 4, $R_1$ and $R_2$ have the above significance, and X signifies the acid radical of a reactive ester in the presence of a basic condensation agent, (b) reacting 1,3,4,4a,5,9b - hexahydro - 2H - indeno-[1,2-c]pyridin-5-ol with a compound of Formula V,

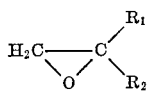

in which $R_1$ and $R_2$ have the above significance, to give a compound of Formula IIa,

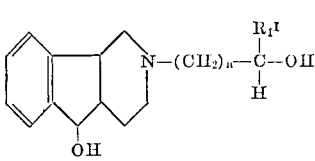

in which $R_1$ and $R_2$ have the above significance, (c) reducing a ketone of Formula VI,

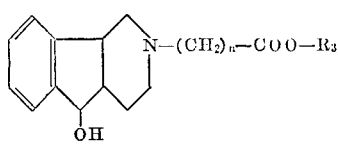

in which $n$ has the above significance, and $R_1^I$ signifies lower alkyl of 1 to 4 carbon atoms, to produce a compound of Formula IIb,

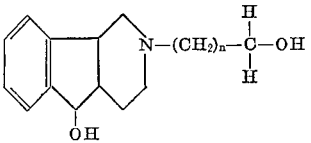

in which $n$ and $R_1^I$ have the above significance, (d) reducing a compound of Formula VII,

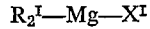

in which $n$ has the above significance, and $R_3$ signifies lower alkyl of 1 to 4 carbon atoms, to produce a compound of Formula IIc,

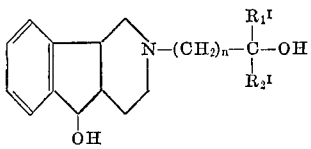

in which $n$ has the above significance, (e) reacting a compound of Formula VI with a Grignard compound of Formula VIII, $$R_2^I\text{—Mg—}X^I \qquad \text{VIII}$$

in which $R_2^I$ signifies lower alkyl of 1 to 4 carbon atoms, and $X^I$ signifies a bromine or iodine atom, or with a lithium alkyl compound of Formula IX, $$R_2^I\text{—Li} \qquad \text{IX}$$

in which $R_2^I$ has the above significance, and hydrolyzing the resulting reaction product to produce a compound of Formula IId,

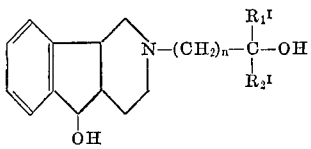

in which $n$ and $R_1^I$ and $R_2^I$ have the above significance, or (f) reacting a compound of Formula VII with a Grignard compound of Formula VIII, $$R_2^I\text{—Mg—}X^I \qquad \text{VIII}$$

in which $R_2^I$ and $X^I$ have the above significance, or with a lithium alkyl compound of Formula IX, $$R_2^I\text{—Li} \qquad \text{IX}$$

in which $R_2^I$ has the above significance, and hydrolyzing the resulting reaction product to produce a compound or Formula IIe,

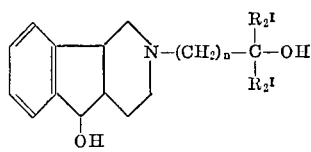

in which $n$ and $R_2^I$ have the above significance. The resulting compounds of general Formula II may optionally be separated into their optical antipodes.

The hydroxy compounds of Formula II may be isolated in the usual manner as free bases or in the form of salts and may be purified in manner known per se, e.g. by crystallization from suitable solvents, e.g. ethyl acetate, ethanol, isopropanol, acetone or hexane.

Process (a) is preferably effected in a solvent which is inert under the reaction conditions, e.g. a chlorinated hydrocarbon, such as chloroform, a lower alkanol, such as ethanol, or an aromatic hydrocarbon, such as xylene. The reaction is preferably effected at the boiling temperature of the reaction mixture. Examples of basic condensation agents which may be used are alkali metal carbonates, such as sodium or potassium carbonate, tertiary organic bases, such as triethylamine. An excess of the compound of Formula III may also be employed to provide a basic condensation catalyst. In the compounds of general Formula IV X preferably signifies halogen, such as chlorine, bromine or iodine, or the methane-, benzene- or p-toluene-sulphonyloxy radical.

Process (b) is preferably effected at an elevated temperature, e.g. 80–120° C., in a solvent which is inert under the reaction conditions, e.g. an alkanol, such as ethanol. The reaction time may range from about 2 to 6 hours. When a low-boiling epoxide, e.g. ethylene oxide, is used, the reaction is advantageously effected at an elevated pressure in an autoclave.

The reduction in process (c) may, for example, be effected with a complex hydride of an alkali metal or with diborane, in a solvent which is inert under the reaction conditions. Examples of complex hydrides of alkali metals which may be used are: lithium aluminum hydride, in which case an open-chain or cyclic ether, such as tetrahydrofuran or dioxane, may be used as solvent; or sodium borohydride, in which case a lower alkanol, such as ethanol, or a mixture of lower alkanols with water, such as ethanol/water, may be used as solvent.

Process (c) may also be affected by catalytic hydrogenation, using preferably platinum, palladium or Raney nickel as catalyst, and a lower alkanol, such as ethanol, as solvent.

Process (d) is preferably effected in a solvent which is inert under the reaction conditions, e.g. tetrahydrofuran or dioxane, using lithium aluminum hydride, lithium borohydride or diborane as reducing agent.

Processes (e) and (f) are preferably effected in a solvent which is inert under the reaction conditions, e.g. an open-chain or cyclic ether, such as diethyl ether of tetrahydrofuran. The hydrolysis step may, for example, be effected with an aqueous ammonium chloride solution.

Optically active compounds of Formula I may be obtained by using optically active compounds of Formula II as starting materials. These optically active compounds of Formula II may be obtained by resolution of the corresponding racemic compounds by reaction with an optically active acid, e.g. di-p-tolyl-D-tartaric acid, di-p-tolyl-L-tartaric acid, dibenzoyl-D-tartaric acid, dibenzoyl-L-tartaric acid, D-malic acid, L-malic acid, D-mandelic acid or L-mandelic acid, to produce diastereoisomeric salts, separating these, e.g. by fractional crystallization, and subsequently liberating the bases with an alkali.

The compound of Formula III may be produced by reacting an isonicotinic acid ester of Formula X,

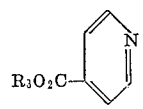
X in which $R_3$ has the above significance, with a compound of Formula IVa, $H_3C—X^I$          IVa in which $X^I$ has the above significance, to give a 1-methylpyridinium halide of Formula XI,

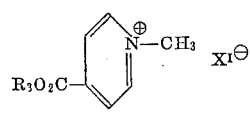
XI in which $R_3$ and $X^I$ have the above significance, e.g. by heating the components for several hours in methanol. Reduction of the compounds of general Formula XI, e.g. with sodium borohydride, yields a tetrahydroisonicotinic acid ester of Formula XII,

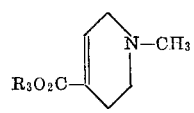
XII in which $R_3$ has the above significance. This is reacted with the magnesium compound of Formula XIII;

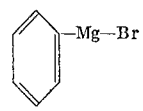
XIII hydrolysis of the resulting product then gives a compound of Formula XIV,

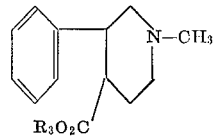
XIV in which $R_3$ has the above significance. This is converted into a compound of Formula XVII,

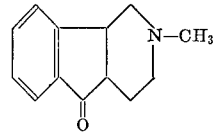
XVII either directly by heating with polyphosphoric acid, or by hydrolysis to the free carboxylic acids of Formula XV,

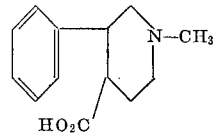
XV production of the acid chloride of Formula XVI,

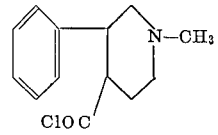
XVI e.g. with thionyl chloride, and cyclization with a Friedel Crafts catalyst, such as anhydrous aluminum chloride. The splitting off of the methyl radical by heating with a lower alkyl ester of chloroformic acid and subsequent hydrolysis of the resulting urethanes, e.g. with hydrochloric acid, yields the ketone of Formula XVIII,

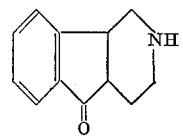
XVIII which may be reduced to the hydroxy compound of Formula III with a complex hydride of an alkali metal in a solvent which is inert under the reaction conditions, e.g. lithium aluminum hydride, in a cyclic ether, such as dioxane or tetrahydrofuran, or sodium borohydride in a lower alcohol, such as ethanol, or a mixture of a lower alcohol with water, e.g. ethanol/water, or by catalytic hydrogenation, e.g. in the presence of a platinum, palladium or nickel catalyst.

The compounds of general Formulae VI and VII have hitherto not been described in the literature and are produced in accordance with the invention by condensing 1,3,4,4a,5,9b - hexahydro - 2H-indeno[1,2-c]pyridin-5-ol (Formula III) which may be in the form of a racemate, mixture of racemates, or optically uniform compound, with a compound of formula XIX or XX, $X'—(CH_2)_n—CO—R_1^I$          XIX $X'—(CH_2)_n—COO—R_3$          XX in which $n$, $R_1^I$ and $R_3$ have the above significance, and $X'$ signifies halogen, preferably chlorine or bromine.

This condensation is preferably effected in the presence of basic condensation agents, such as inorganic bases, e.g. alkali metal carbonates, or tertiary organic bases, e.g. triethylamine, or an excess of the compounds of general Formula III, and in a solvent which is inert under the reaction conditions, such as chloroform, toluene, dimethylformamide. It is advisable to effect this condensation at an elevated temperature, preferably at the boiling temperature of the solution, in order to increase the reaction velocity.

Isolation and, if necessary, purification of the compounds of general Formula VI or VII is effected in manner known per se. Where racemates of compounds of general Formula VI or VII are obtained, these may be split into their optical antipodes with optically active acids, e.g. camphorsulphonic acid.

Compounds of Formula VIa or VIIa,

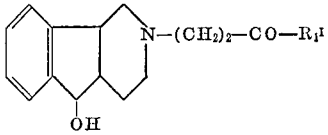
VIa

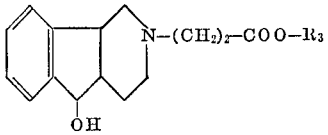
VIIa in which $R_1^I$ and $R_3$ have the above significance, are obtained by reacting compounds of Formula III with vinyl ketones of Formula XXI, $$H_2C=CH-CO-R_1^I \qquad XXI$$

in which $R_1^I$ has the above significance, or with acrylic acid esters of Formula XXII, $$H_2C=CH-CO_2-R_3 \qquad XXII$$

in which $R_3$ has the above significance.

Insofar as the production of the required starting materials is not described, these are known or may be produced in accordance with known processes or in a manner analogous to the processes described herein or in manner known per se.

In the following examples which illustrate the invention without in any way limiting its scope, all temperatures are indicated in degrees centigrade and are uncorrected.

EXAMPLE 1

2-(2-hydroxyethyl)-1,3,4,9b-tetrahydro-2H-indeno[1,2-c]pyridine hydrochloride 12 g. of 2-(2-hydroxyethyl)-1,3,4,4a,5,9b-hexahydro-2H-indeno[1,2-c]pyridin-5-ol are heated to the boil at reflux for 20 minutes with 60 cc. of a mixture of 3 parts of concentrated hydrochloric acid and 7 parts of water. The reaction mixture is allowed to cool, is filtered and the resulting crude product is recrystallized from 2 N hydrochloric acid. The title compound has a M.P. of 260° (decomp.).

The 2 - (2-hydroxyethyl)-1,3,4,4a,5,9b-hexahydro-2H-indeno[1,2-c]pyridin-5-ol, used as starting material, is produced as follows:

A solution of 15 g. of 1,3,4,4a,5,9b-hexahydro-2H-indeno[1,2-c]pyridin-5-ol and 3.5 g. of ethylene oxide in 150 cc. of ethanol is heated to 100° in an autoclave for 4 hours. The solution is allowed to cool, is concentrated by evaporation and the residue is recrystallized twice from ethyl acetate. The resulting 2-(2-hydroxyethyl)-1,3,4,4a,5,9b-hexahydro-2H-indeno[1,2-c]pyridin-5-ol has a M.P. of 81–83°.

EXAMPLE 2

2-(3-hydroxypropyl)-1,3,4,9b-tetrahydro-2H-indeno[1,2-c]pyridine hydrochloride 12 g. of 2-(3-hydroxypropyl)-1,3,4,4a,5,9b-hexahydro-2H-indeno[1,2-c]pyridin-5-ol are heated to the boil at reflux for 20 minutes with 120 cc. of 2 N hydrochloric acid. The reaction mixture is subsequently concentrated by evaporation and the residue is taken up in isopropanol, whereby the title compound crystallizes. After recrystallization from ethanol the compound has a M.P. of 172–176°.

The 2 - (3 - hydroxypropyl)-1,3,4,4a,5,9b-hexahydro-2H-indeno[1,2-c]pyridin-5-ol, used as starting material, is produced as follows:

(a) 2-(2-ethoxycarbonylethyl)-1,3,4,4a,5,9b-hexahydro-2H-indeno[1,2-c]pyridin-5-ol: 21.2 g. of acrylic acid ethyl ester are added dropwise to a solution of 20 g. of 1,3,4,4a,5,9b - hexahydro-2H-indeno[1,2-c]pyridin-5-ol in 200 cc. of ethanol. The mixture is then heated to the boil at reflux for 14 hours and is subsequently concentrated by evaporation. The residue is dissolved in ether, the solution is washed twice with a 10% sodium carbonate solution, is dried over magnesium sulphate and concentrated by evaporation. Crude 2-(2-ethoxycarbonylethyl)-1,3,4,4a,5,9b-hexahydro-2H-indeno[1,2-c]pyridin-5-ol is obtained as a brown, viscous oil.

(b) 2-(3-hydroxypropyl)-1,3,4,4a,5,9b-hexahydro-2H-indeno[1,2-c]pyridin-5-ol: A solution of 15 g. of crude 2 - (2 - ethoxycarbonylethyl)1,3,4,4a,5,9b-hexahydro-2H-indeno[1,2-c]pyridin-5-ol in 70 cc. of tetrahydrofuran is added dropwise at room temperature to a suspension of 2.05 g. of lithium aluminum hydride in 200 cc. of absolute tetrahydrofuran. The mixture is heated to the boil at reflux while stirring well for 2 hours, is subsequently cooled to 5° and 35 cc. of a saturated sodium sulphate solution are carefully added dropwise. The precipitate is filtered off and boiled out twice with tetrahydrofuran and the filtrate is then concentrated by evaporation. Crude 2 - (3 - hydroxypropyl)-1,3,4,4a,5,9b-hexahydro-2H-indeno[1,2-c]pyridin-5-ol is obtained as a yellow, viscous oil, which is further used without purification.

EXAMPLE 3

2-(2-hydroxypropyl)-1,3,4,9b-tetrahydro-2H-indeno[1,2-c]pyridine hydrochloride 15 g. of crude 2-(2-hydroxypropyl)-1,3,4,4a,5,9b-hexahydro-2H-indeno[1,2-c]pyridin-5-ol are heated to the boil at reflux for 20 minutes with 150 cc. of 2 N hydrochloric acid. After cooling, the precipitate is filtered off and recrystallized from dilute hydrochloric acid. The resulting title compound has a M.P. of 250–255° (decomp.).

The 2-(2-hydroxypropyl) - 1,3,4,4a,5,9b - hexahydro-2H-indeno[1,2-c]pyridin-5-ol, used as starting material is produced as follows:

(a) 2-acetonyl - 1,3,4,4a,5,9b - hexahydro-2H-indeno[1,2-c]pyridin-5-ol: 50 g. of 1,3,4,4a,5,9b-hexahydro-2H-indeno[1,2-c]pyridin-5-ol, 29.4 g. of chloroacetone, 62.5 g. of anhydrous sodium carbonate and 1.2 liters of chloroform are heated to the boil at reflux for 18 hours. After cooling the precipitate is filtered off, the filtrate is washed twice with water, is dried over magnesium sulphate and concentrated by evaporation. The residue is dissolved in acetone and filtered over 100 g. of silica gel. Washing is again effected with acetone until complete elution occurs, the solution is concentrated by evaporation and the residue recrystallized twice from benzene. The resulting 2-acetonyl - 1,3,4,4a,5,9b - hexahydro-2H-indeno[1,2-c]pyridin-5-ol has a M.P. of 94–96°.

(b) 2-(2 - hydroxypropyl) - 1,3,4,4a,5,9b-hexahydro-2H-indeno[1,2-c]pyridin-5-ol: A solution of 15 g. of 2-acetonyl - 1,3,4,4a,5,9b - hexahydro-2H-indeno[1,2-c]pyridin-5-ol in 150 cc. of ethanol is shaken with 0.4 g. of platinum oxide and hydrogen. After 1.45 liters of hydrogen have been taken up, hydrogenation is stopped, the catalyst is filtered off and the solution concentrated by evaporation. A mixture of stereoisomers of 2-(2-hydroxypropyl) - 1,3,4,4a,5,9b - hexahydro - 2H - indeno[1,2-c]pyridin-5-ol is obtained as a viscous oil intermingled with crystals, which may be further used as such.

EXAMPLE 4

2-(2-hydroxy-2-methylpropyl)-1,3,4,9b-tetrahydro-2H-indeno[1,2-c]pyridine hydrochloride 9 g. of 2-(2-hydroxy-2-methylpropyl)-,3,4,4a,9b-hexahydro-2H-indeno[1,2-c]pyridin-5-ol are heated to the boil at reflux for 20 minutes with 90 cc. of 2 N hydrochloric acid. The mixture is completely evaporated in a vacuum at 60° and the residue is crystallized, first from isopropanol and then from ethanol. The resulting title compound has a M.P. of 197–199° (decomp.).

The 2-(2-hydroxy-2-methylpropyl)-1,3,4,4a,5,9b - hexahydro-2H-indeno[1,2-c]pyridin-5-ol, used as starting material, is produced as follows:

A solution of 14.8 g. of 2-acetonyl-1,3,4,4a,5,9b-hexahydro-2H-indeno[1,2-c]pyridin-5-ol (production see Example 3) in 50 cc. of absolute tetrahydrofuran is added dropwise at 20° to a methyl magnesium iodide solution prepared from 5.8 g. of magnesium and 34.5 g. of methyl iodide in 75 cc. of ether. The solution is subsequently boiled at reflux for 2 hours, is then cooled, the reaction mixture is poured onto 600 cc. of a 10% ammonium chloride solution and is extracted with ether. After drying over magnesium sulphate the solvent is distilled off and the residue crystallized twice from acetone. The resulting 2-(2-hydroxy-2-methylpropyl) - 1,3,4,4a,5,9b-hexahydro-2H-indeno[1,2-c]pyridin-5-ol has a M.P. of 134–136°.

EXAMPLE 5

2-(3-hydroxybutyl)-1,3,4,9b-tetrahydro-2H-indeno[1,2-c]pyridine hydrochloride 18 g. of crude 2-(3-hydroxybutyl)-1,3,4,4a,5,9b-hexahydro-2H-indeno[1,2-c]pyridin-5-ol are heated to the boil at reflux for 20 minutes with 200 cc. of 2 N hydrochloric acid. The reaction mixture is then concentrated by evaporation in a vacuum and the residue is triturated with acetone, whereby the title compound crystallizes. It is recrystallized twice from ethanol. M.P. 210–212° (decomp.).

The 2-(3-hydroxybutyl) - 1,3,4,4a,5,9b - hexahydro-2H-indeno[1,2-c]pyridin-5-ol, used as starting material, is produced as follows:

(a) 2-(3 - oxobutyl) - 1,3,4,4a,5,9b - hexahydro-2H-indeno[1,2-c]pyridin-5-ol: A solution of 11.1 g. of methyl-vinyl ketone in 10 cc. of ethanol is added dropwise at 70° during the course of 10 minutes to a solution of 25 g. of 1,3,4,4a,5,9b-hexahydro - 2H - indeno[1,2-c]pyridin-5-ol in 250 cc. of methanol, and the reaction mixture is heated at reflux for 40 minutes. The reaction mixture is completely concentrated by evaporation in a vacuum, the residue is dissolved in 100 cc. of benzene and the solution is poured onto a column of 250 g. of silica gel. Washing is first effected with 2 liters of benzene, and then with acetone until complete elution occurs. The acetone eluates are concentrated by evaporation, whereby 2-(3-oxobutyl)-1,3,4,4a,5,9b - hexahydro - 2H - indeno[1,2-c]pyridin-5-ol is obtained as a brownish coloured, resinous mass, which crystallizes after standing for a long time.

(b) 2-(3 - hydroxybutyl) - 1,3,4,4a,5,9b - hexahydro-2H-indeno[1,2-c]pyridin-5-ol: 2.74 g. of sodium borohydride are added portionwise during the course of 15 minutes to a solution of 18.9 g. of 2-(3-oxobutyl)-1,3,4,4a,5,9b-hexahydro - 2H - indeno[1,2-c]pyridin-5-ol in 190 cc. of ethanol, whereby the temperature rises to 40°. The mixture is stirred at this temperature for a further hour, is heated at reflux for 1½ hours, 7 cc. of methanol are added and the mixture is again heated at reflux for 1 hour. After concentrating by evaporation in a vacuum, 200 cc. of water are added to the residue and extraction is effected several times with methylene chloride. After drying over magnesium sulphate the extracts are concentrated by evaporation and the residue is used for the further reactions without further purification.

EXAMPLE 6

2-(4-hydroxybutyl)-1,3,4,9b-tetrahydro-2H-indeno[1,2-c]pyridine hydrochloride 26.0 g. of 2-(4-hydroxybutyl)-1,3,4,4a,5,9b-hexahydro-2H-indeno[1,2-c]pyridin-5-ol are heated at reflux for 30 minutes with 260 cc. of 2 N hydrochloric acid. The mixture is subsequently evaporated to dryness in a vacuum and the residue is recrystallized from ethanol/ether. M.P. 151–153°.

The 2-(4 - hydroxybutyl) - 1,3,4,4a,5,9b-hexahydro-2H-indeno[1,2-c]pyridin-5-ol, used as starting material, is produced as follows:

(a) 2-(4 - ethoxycarbonylpropyl) - 1,3,4,4a,5,9b-hexahydro - 2H - indeno[1,2-c]pyridin-5-ol: 20.0 g. of 1,3,4,4a,5,9b-hexahydro - 2H - indeno[1,2-c]pyridin-5-ol, 24.0 g. of sodium carbonate and 22.6 g. of γ-bromobutyric acid ethyl ester are heated at reflux for 6 hours in 500 cc. of chloroform. After cooling, the reaction mixture is filtered and the filtrate is concentrated by evaporation. The residue is dissolved in acetone and filtered over 200 g. of silica gel. The filtrate is again concentrated by evaporation and the residue used for the following reaction without further purification.

(b) 2-(4 - hydroxybutyl) - 1,3,4,4a,5,9b-hexahydro-2H-indeno[1,2-c]pyridin-5-ol: 20 g. of the crude product obtained in accordance with section (a) above are dissolved in 200 cc. of absolute ether and added dropwise to a suspension of 10.5 g. of lithium aluminum hydride. The mixture is heated at reflux for 2 hours, the excess reduction agent is decomposed by the addition of water, filtration is effected, the ether solution is dried with sodium sulphate and the solvent is distilled off. The residue is recrystallized from benzene/petroleum ether. M.P. 84–85°.

What is claimed is:

1. A pharmaceutically acceptable acid addition salt of an indenopyridine derivative of the formula:

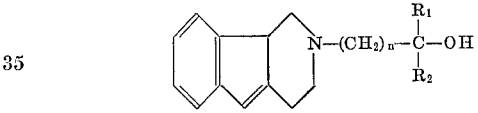

where $n$ is an integer of from 1 to 4, and $R_1$ and $R_2$ are hydrogen or lower alkyl of 1 to 4 carbon atoms.

2. The compound of claim 1, which is an acid addition salt of 2-(2-hydroxyethyl-1,3,4,9b-tetrahydro-2H-indeno[1,2-c]pyridine.

3. The compound of claim 1, which is an acid addition salt of 2-(3-hydroxypropyl)-1,3,4,9b-tetrahydro-2H-indeno[1,2-c]pyridine.

4. The compound of claim 1, which is an acid addition salt of 2-(2-hydroxypropyl)-1,3,4,9b-tetrahydro-2H-indeno[1,2-c]pyridine.

5. The compound of claim 1, which is an acid addition salt of 2-(2-hydroxy-2-methylpropyl)-1,3,4,9b-tetrahydro-2H-indeno[1,2-c]pyridine.

6. The compound of claim 1, which is an acid addition salt of 2-(3-hydroxybutyl)-1,3,4,9b-tetrahydro-2H-indeno[1,2-c]pyridine.

7. The compound of claim 1, which is an acid addition salt of 2-(4-hydroxybutyl)-1,3,4,9b-tetrahydro-2H-indeno[1,2-c]pyridine.

8. A compound of the formula:

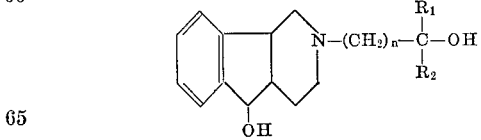

wherein $n$ is an integer of from 1 to 4, and $R_1$ and $R_2$ are hydrogen or lower alkyl of 1 to 4 carbon atoms.

9. The compound of claim 8, which is 2-(2-hydroxyethyl - 1,3,4,4a,5,9b - hexahydro-2H-indeno[1,2-c]pyridin-5-ol.

10. The compound of claim 8, which is 2-(3-hydroxypropyl) - 1,3,4,4a,5,9b - hexahydro-2H-indeno[1,2-c]pyridin-5-ol.

11. The compound of claim 8, which is 2-(2-hydroxypropyl) - 1,3,4,4a,5,9b - hexahydro-2H-indeno[1,2-c]pyridin-5-ol.

12. The compound of claim 8, which is 2-(2-hydroxy-2-methylpropyl) - 1,3,4,4a,5,9b - hexahydro-2H-indeno[1,2-c]pyridin-5-ol.

13. The compound of claim 8, which is 2-(3-hydrobutyl) - 1,3,4,4a,5,9b - hexahydro-2H-indeno[1,2-c]pyridin-5-ol.

14. The compound of claim 8, which is 2-(4-hydrobutyl) - 1,3,4,4a,5,9b - hexaydro-2H-indeno[1,2-c]pyridin-5-ol.

References Cited

UNITED STATES PATENTS

| 3,408,353 | 10/1968 | Jucker et al. | 260—293 |
| 3,497,517 | 2/1970 | Jucker et al. | 260—293 |
| 3,499,895 | 3/1970 | Jucker et al. | 260—247.5 |

ALAN L. ROTMAN, Primary Examiner

U.S. Cl. X.R.

260—294.3, 294.8, 295, 295.5, 297, 999